(12) United States Patent
Gong et al.

(10) Patent No.: US 10,168,221 B2
(45) Date of Patent: Jan. 1, 2019

(54) UNCOOLED, HIGH SENSITIVITY SPECTRAL SELECTIVE INFRARED DETECTOR

(71) Applicant: The Board of Trustees of the University of Illinois, Urbana, IL (US)

(72) Inventors: Songbin Gong, Champaign, IL (US); Daniel M. Wasserman, Urbana, IL (US)

(73) Assignee: Board of Trustees of the University of Illinois, Urbana, IL (US)

( * ) Notice: Subject to any disclaimer, the term of this patent is extended or adjusted under 35 U.S.C. 154(b) by 124 days.

(21) Appl. No.: 15/462,238

(22) Filed: Mar. 17, 2017

(65) Prior Publication Data

US 2017/0268931 A1   Sep. 21, 2017

Related U.S. Application Data

(60) Provisional application No. 62/310,334, filed on Mar. 18, 2016.

(51) Int. Cl.
*G01J 5/02* (2006.01)
*G01J 5/08* (2006.01)
(Continued)

(52) U.S. Cl.
CPC .......... *G01J 5/0853* (2013.01); *B81B 3/0024* (2013.01); *B82Y 15/00* (2013.01); *G01J 3/2803* (2013.01); *G01J 5/0825* (2013.01)

(58) Field of Classification Search
CPC .................................................. G01J 5/0853
See application file for complete search history.

(56) References Cited

U.S. PATENT DOCUMENTS 6,765,211 B2    7/2004  Tapalian et al.
9,012,845 B2 *  4/2015  Kaufman ............... G01J 5/34
                                             250/338.1
(Continued)

FOREIGN PATENT DOCUMENTS

CN    203998935 U    12/2014
WO    2014083326 A1   5/2014
WO    2015012914 A2   1/2015

OTHER PUBLICATIONS

Ang et al., "Simulation and design of AlN piezoelectric resonator for infrared sensing application utilizing Lamb wave mode," 2014, IEEE Ninth International conference on intelligence sensors, sensor networks and information processing symposium pp. 1-6. (Year: 2014).*

(Continued)

*Primary Examiner* — Kiho Kim
(74) *Attorney, Agent, or Firm* — Lowenstein Sandler LLP

(57) ABSTRACT

An infrared (IR) detector comprises a radio frequency (RF) resonator including a bottom electrode to provide acoustic excitation, a piezoelectric layer connected to the bottom electrode and suspended over a cavity defined within a semiconductor substrate, and a top layer comprising a mid-IR metamaterial and which is connected to the piezoelectric layer of the RF resonator. The top layer and the piezoelectric layer are sized to impedance match with a particular IR wavelength, to minimize reflection and maximize absorption of a particular IR wavelength, and thus make the top layer polarization sensitive to the particular IR wavelength.

17 Claims, 15 Drawing Sheets

(51) Int. Cl.
*B81B 3/00* (2006.01)
*B82Y 15/00* (2011.01)
*G01J 3/28* (2006.01)

(56) References Cited

U.S. PATENT DOCUMENTS 9,121,761 B2 9/2015 Nam et al.
2012/0286161 A1 11/2012 Raieszadeh et al.

OTHER PUBLICATIONS

Lee et al., "Mid-infrared transmission enhancement through sub-wavelength metal hole array using impedance-matching dielectric layer," 2009, Electronics Letters, vol. 45, No. 12 , 2 pages. (Year: 2009).*
Werle et al., "Near- and Mid-Infrared Laser-Optical Sensors for Gas Analysis," Optics and Lasers in Engineering 37, pp. 101-114, Jul. 12, 2001.
Mahulikar et al., "Infrared Signature Studies of Aerospace Vehicles," Progress in Aerospace Sciences 43, pp. 218-245, Aug. 22, 2007.
Rogalski, "Infrared Detectors: Status and Trends," Progress in Quantum Electronics 27, pp. 59-210, Dec. 2003.
Razeghi, "Advances in Mid-Infrared Detection and Imaging: A Key Issues Review," Reports on Progress in Physics, vol. 77, pp. 1-17, Aug. 4, 2014.
Tadigadapa et al., "Piezoelectric MEMS Sensors: State-Of-The-Art and Perspectives," Measurement Science and Technology, vol. 20, pp. 1-30, Jul. 24, 2009.
Gong et al., "GHz AlN Lateral Overmoded Bulk Acoustic Wave Resonators with a f • Q of 1.17×1013," Frequency Control and the European Frequency and Time Forum (FCS), 2011 Joint Conference of the IEEE International, 5 pages, May 2-5, 2011.
Hui et al., "Ultra-Fast and High Resolution NEMS Thermal Detector Based on a Nano-Air-Gap Piezoelectric Resonant Structure," Sensors, 2012 IEEE, 4 pages, Oct. 28-31, 2012.
Crespin et al., "Fully Integrated Switchable Filter Banks," Microwave Symposium Digest (MTT), 2012 IEEE MTT-S International, 3 pages, Jun. 17-22, 2012.
Pisani et al., "Application of Micromachined Y-Cut-Quartz Bulk Acoustic Wave Resonator for Infrared Sensing," Journal of Microelectromechanical Systems, vol. 20, No. 1, pp. 288-296, Feb. 2011.
Gokhale, "Uncooled Infrared Detectors Using Gallium Nitride on Silicon Micromechanical Resonators," Journal of Microeletromechanical Systems, vol. 23, No. 4, pp. 803-810, Aug. 2014.
Hui et al., "High Performance NEMS Resonant Infrared Detector Based on an Aluminum Nitride Nano-Plate Resonator," Transducers 2013, Barcelona, Spain, pp. 968-971, Jun. 16-20, 2013.
Hui et al., "Plasmonic Piezoelectric Nanomechanical Resonator for Spectrally Selective Infrared Sensing," Nature Communications 7, Article No. 11249, pp. 1-9, Apr. 15, 2016.
Liu et al., "Multiplexed Infrared Photodetection Using Resonant Radio-Frequency Circuits," Applied Physics Letter, vol. 108, Issue 6, 6 pages, Feb. 2016.
Piazza et al., "Piezoelectric Aluminum Nitride Vibrating Contour-Mode MEMS Resonators," Journal of Microelectromechanical Systems, vol. 15, No. 6, 15 pages, Dec. 2006.
Lu et al., "Deciphering Intermodulation in AlN Laterally Vibrating Resonators," MEMS 2016, Shanghai, China, pp. 671-674, Jan. 24-28, 2016.
Mauck, "Knife-Edge Profiling of Q-Switched Nd:YAG Laser Beam and Waist," Applied Optics, vol. 18, No. 5, pp. 599-600, Mar. 1, 1979.
Niklaus et al., "MEMS-Based Uncooled Infrared Bolometer Arrays—A Review," Proceedings of SPIE—The International Society for Optical Engineering, 16 pages, Mar. 2008.
Mason et al., "Strong Absorption and Selective Thermal Emission from a Mid-Infrared Metamaterial," Applied Physics Letter, 98, 241105,14 pages Apr. 14, 2011.
Gong et al., "A 1.75 GHz Piezoelectrically-Transduced Sic Lateral Overmoded Bulk Acoustic-Wave Resonator," Transducers'11, Beijing, China, pp. 922-925, Jun. 5-9, 2011.
Mason et al., "Strong Coupling of Molecular and Mid-Infrared Perfect Absorber Resonances," IEEE Photonics Technology Letters, vol. 24, No. 1, pp. 31-33, Jan. 1, 2012.
Hui et al., "Resonant Infrared Detector Based on a Piezoelectric Fishnet Metasurface," Frequency Control Symposium & the European Frequency and Time Forum (FCS), 2015 Joint Conference of the IEEE International, 3 pages, Apr. 12-16, 2015.
Breen et al., "High Speed Mid-Infrared Detectors Based on MEMS Resonators and Spectrally Selective Metamaterials," Frequency Control Symposium (IFCS), 2016 IEEE International, 6 pages, May 9-12, 2016.
Maier et al., "Wavelength-Tunable Microbolometers With Metamaterial Absorbers," Optics Letters, vol. 34, No. 19, pp. 3012-3014, Oct. 1, 2009.

* cited by examiner

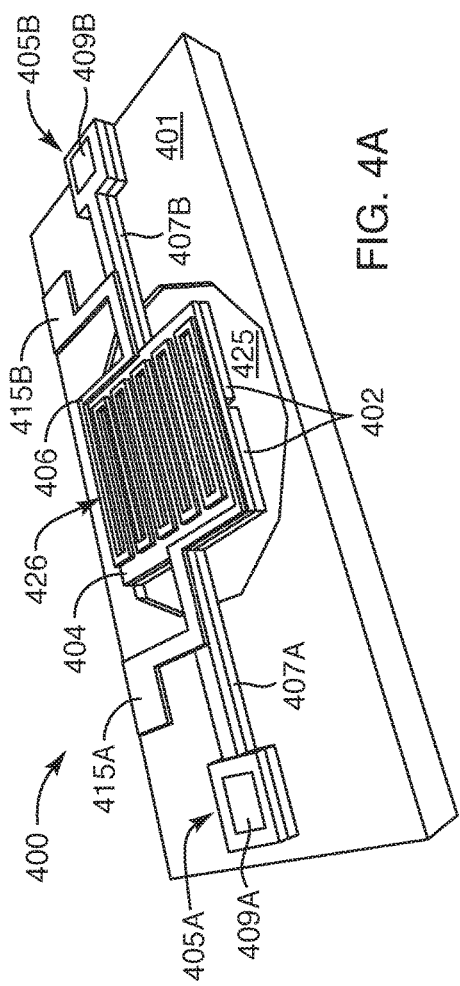
FIG. 4A
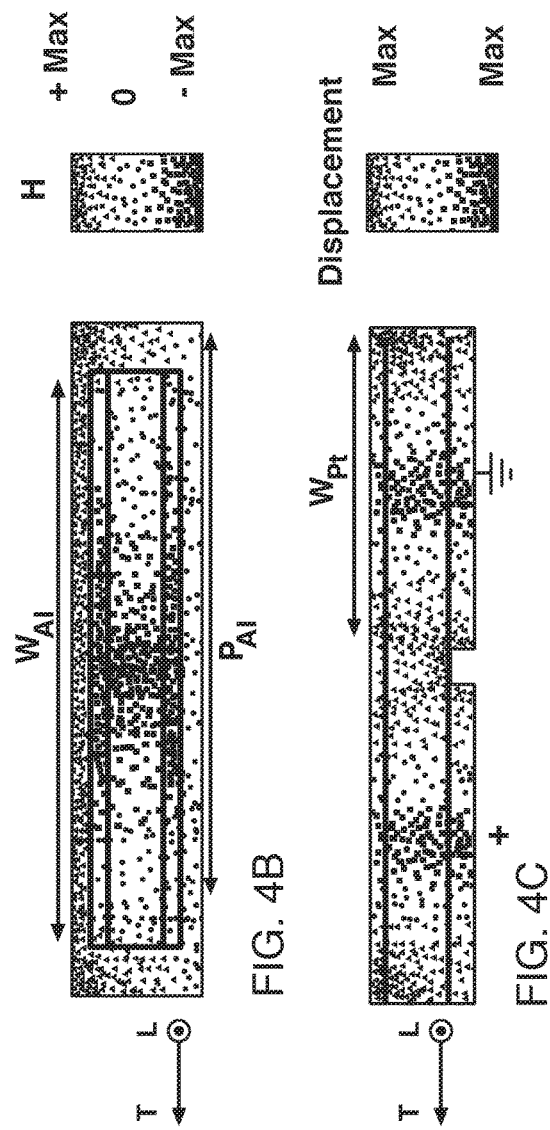
FIG. 4B
FIG. 4C

1. Bare Si Wafer

2. Bottom Electrode Definition

3. AlN Deposition

4. Top Electrode Definition

5. Structure Release(XeF$_2$)

UNCOOLED, HIGH SENSITIVITY SPECTRAL SELECTIVE INFRARED DETECTOR

REFERENCE TO EARLIER FILED APPLICATION

This application claims the benefit under 35 U.S.C. § 119(e) of U.S. Provisional Patent Application No. 62/310,334, filed Mar. 18, 2016, which is incorporated herein, in its entirety, by this reference.

BACKGROUND

The field of mid-infrared (IR) detection has grown rapidly in recent years due to increasing demand for a wide range of applications such as gas sensing, thermal imaging, and atmospheric tracking. As the desire for a wider range of applications has grown, the current state of the art, consisting of semiconductor photon detectors and thermal detectors, has been unable to meet all the demands of the growing mid-IR market. Photon detectors offer high sensitivity and speed as well as control over the cut-off wavelength by engineering the band gap of the absorbing material. However, such detectors require expensive, bulky cryogenic cooling to maintain their sensitivity. Additionally, due to the dependence of peak absorption wavelength on the material properties of the semiconductor, fabrication of arrays of detectors configured for different frequencies is expensive and complex.

On the other hand, thermal detectors, of which bolometers are the most popular, can typically operate at room temperature but have been unable to approach the speed and sensitivity of photon detectors. Thermal detectors can be produced and operated for significantly lower costs than cryogenic cooled detectors and consequently have opened up new opportunities in a range of markets, particularly consumer markets. There remains, however, a substantial unfilled vacancy between the two types of detectors for applications where the high cost of photon detectors and the relatively lower performance of thermal detectors make both options unworkable.

BRIEF DESCRIPTION OF THE DRAWINGS

A more particular description of the disclosure briefly described above will be rendered by reference to the appended drawings. Understanding that these drawings only provide information concerning typical embodiments and are not therefore to be considered limiting of its scope, the disclosure will be described and explained with additional specificity and detail through the use of the accompanying drawings.

FIG. 4A is a diagram of the disclosed IR detector in which the metamaterial layer is a continuous metal line having a plurality of switchback folds, according to an embodiment of the present disclosure.

FIG. 4B is a transverse cross-sectional view of a magnetic field within a piezoelectric layer between the metamaterial layer and bottom electrodes of the disclosed IR detector, using rigorous coupled wave analysis (RCWA), according to embodiments of the present disclosure.

FIG. 4C is a longitudinal cross-sectional view of a simulated lateral acoustic displacement mode shape of the disclosed IR detector, according to embodiments of the present disclosure.

DETAILED DESCRIPTION

Figure 1A:
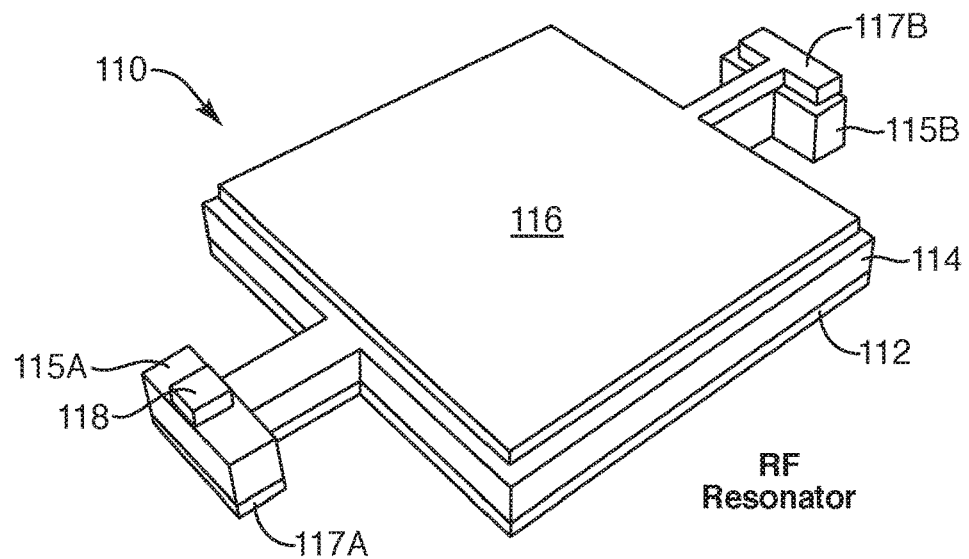
FIG. 1A is a perspective view of a radio frequency (RF) resonator, according to embodiments of the present disclosure.

By way of introduction, the present disclosure relates to an updated infrared (IR) detector which can operate uncooled, but with high performance, at a reasonable price using existing complementary metal-oxide semiconductor (CMOS) technology. In one embodiment, the IR detector is a combination of a radio frequency (RF) resonator and a mid-IR metamaterial (MM) absorber. The combination may be created in the IR detector with an RF resonator that includes a bottom electrode to provide acoustic excitation, a piezoelectric layer connected to the bottom electrode and suspended over a cavity defined within a semiconductor substrate, and a top layer including a mid-IR metamaterial (e.g., MM layer) and connected to the piezoelectric layer. In various embodiments, the MM layer and the piezoelectric layer are sized to impedance match with a particular IR wavelength, to minimize reflection and maximize absorption of the particular IR wavelength, and thus make the MM layer polarization sensitive to the particular IR wavelength. A corresponding read out circuit is also disclosed that may detect the particular IR wavelength when incident on the IR detector.

The field of mid-infrared (mid-IR) optoelectronics has experienced significant growth over the past two decades, spurred by a wide range of sensing and security applications, and enabled by the rapid development and commercialization of the quantum cascade laser (QCL), a wavelength-flexible, compact, high-power, and increasingly high efficiency semiconductor laser. The QCL may provide room-temperature, monochromatic, and wavelength-tunable sources for mid-IR sensing systems. However, the rapid advances in source development have yet to be matched by equivalent strides in mid-IR detectors. The current detector of choice is the HgCdTe (MCT) detector, which offers high-sensitivity light detection at liquid nitrogen temperature, but whose performance drops off rapidly at room temperature. Multiple other semiconductor-based detectors have been proposed and studied (quantum well IR photodetectors (QWIPs), quantum dot IR photodetectors (QDIPs), Type II superlattices (T2SL's), two n-type semiconductors sandwiching a barrier layer (nBn's)) with varying degrees of success, but suffering from significantly degraded performance at room temperature and thus requiring (often cryogenic) cooling for optimal performance.

Currently, uncooled mid-IR detection systems that can be manufactured at low cost are generally enabled by pyroelectric or microbolometer sensors. In spite of their pervasiveness in thermal imaging systems, improvement in microbolometer sensors performance has been stagnant in the past two decades. The state of the art of micro-bolometers have a temperature coefficient of resistance (TCR) of $-0.5$-$3\%$ $K^{-1}$ and consequently a noise equivalent power (NEP) in the $10^{-9}$ $W/\sqrt{Hz}$ range. Note that % $K^{-1}$ refers to temperature in Kelvin measured in parts per million (ppm). Researchers have resorted to integrating new materials such as amorphous silicon germanium (a-SiGe) of $-5\%$ $K^{-1}$ to moderately enhance the TCR. However, significant drawbacks such as higher manufacturing cost and indistinguishable absorption at difference bands are affiliated with these new materials.

Additionally, microbolometers are not equipped with band-selective absorbers and their designs present formidable challenges to the incorporation of metamaterial (MM)-based absorber. The electrodes on microbolometers have high resistivity, and may not be cooperatively used to form the MM layer of an MM absorber. Moreover, wideband absorption characteristics of a-Si can mask the selective absorption properties of the MM even if it were possible to fuse the MM with micro bolometers. Although one may propose to stack the MM absorber on top of the microbolometer, the increase in thermal mass would further compromise the responsivity, noise equivalent power, and speed.

A variety of pyroelectric ceramic materials may be available to enable building IR detectors. However, even with materials of high pyroelectric properties (e.g., lead zirconate titanate (PZT) and polyvinylidene fluoride (PVDF)), only a moderate NEP of several $10^{-8}$ $W/\sqrt{Hz}$ can be attained. The thermal time constant of these sensors are high, in hundreds of milliseconds due to low thermal conductivity and fabrication limits of pyroelectric sensors. In addition, the synthesis and use of lead-based ceramics prevent the pyroelectric sensors to be manufactured in foundries that service the CMOS industry. Production of pyroelectric sensors has to resort to small-scale, application-specific foundries where yield is lower and cost is higher.

Other technologies, such as nanowire, a-Si thin-film transistors (TFT), surface plasmonic absorbers, and cytochrome c protein are currently under development for IR detection. While nanowire-based-IR detectors expediently leverage device scaling to improve sensitivity, nanowire-based-IR detectors lack the manufacturability and have not shown clear path to accomplish a transition to industrial production. On the hand, a-Si TFT technology has the benefits of low-cost and high-yield manufacturing, but without the capability of being spectrally selective on wafer-level for even higher sensitivity. The absorbance of plasmonic absorbers has a dependence on radiation incidence angle, thus suffering from absorption degradation induced by optical broadening in measurement systems. The cytochrome c protein has shown a high TCR of $20\%$ $K^{-1}$ for IR detection in liquid solution. Nevertheless, the long-term reliability and lifetime of such devices is unknown, and thus unpredictable, when integrated with supporting electronics.

FIG. 1A is a perspective view of a radio frequency (RF) resonator 110, according to embodiments of the present disclosure. The RF resonator 110 may include a bottom electrode 112, a suspended resonator body 114 made of a piezoelectric material, and a top electrode 116. The RF resonator 110 may also include a pair of anchors 115A, 115B at either end of the RF resonator. Each anchor 115A and 115B may remain attached to a semiconductor (e.g., silicon) substrate over which the RF resonator 110 is mechanically suspended. The RF resonator 110 may be either micro-electro-mechanical (MEM) device or a nano-electro-mechanical (NEM) device.

In various embodiments, the RF resonator 110 may further include a first metal lead 117A to carry an input to the bottom electrode 112. The first metal lead 117A may pass below the anchor 115A, which may include a via 118 through which to pass some of the metal from the first metal lead 117A. The RF resonator 110 may further include a second metal lead 117B that passes over the anchor 115B to carry an output of the RF resonator 110. When an RF signal matches (or sufficiently matches) a particular frequency, the resonator body 114 of the RF resonator 110 may vibrate laterally and provide a corresponding signal to the output. The resonant frequency may be determined by the stiffness of the resonator body 114 combined with the top and bottom electrodes, and the physical dimensions of the RF resonator 110.

Figure 1B:
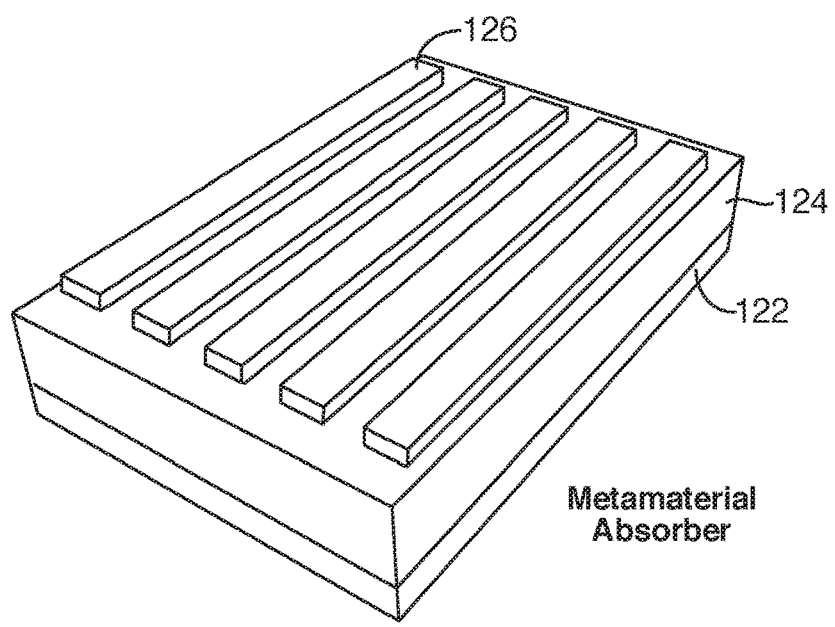
FIG. 1B is a perspective view of a metamaterial (MM) absorber, according to embodiments of the present disclosure.

FIG. 1B is a perspective view of a metamaterial (MM) absorber 120, according to embodiments of the present disclosure. The MM absorber 120 may include a bottom ground plane 122 (which also serves as a bottom electrode), a dielectric spacer 124, and a plurality of metallic structures 126 (which make up the MM layer, and can also serve as a top electrode). The metallic structures 126 may also form an array of electrodes as will be further explained with reference to FIGS. 2A-2D. The MM absorber 120 may be designed to capture a shift in output voltage due to incident IR radiation power absorbed by the MM structures.

Figure 1C:
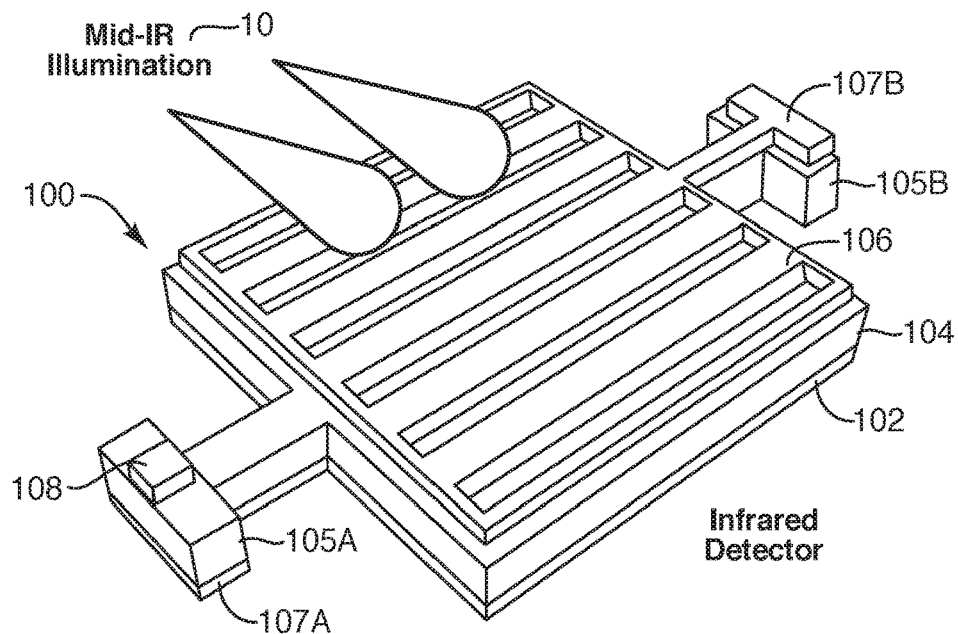
FIG. 1C is a perspective view of an infrared (IR) detector manufactured from a combination of the RF resonator of FIG. 1A and the MM absorber of FIG. 1B, according to embodiments of the present disclosure.

FIG. 1C is a perspective view of an infrared (IR) detector 100 manufactured from a combination of the RF resonator 110 of FIG. 1A and the MM absorber 120 of FIG. 1B, according to embodiments of the present disclosure. In various embodiments, the IR detector 100 may include a bottom electrode 102, a thin film resonator body 104 made of a piezoelectric material and mechanically suspended (as was the resonator body 114 of the RF resonator 110), and an MM layer 106 (e.g., top layer) made of the MM structures 126 as formed on the top of the MM absorber 120 of FIG. 1B. The MM structures 126, in one example, include a plurality of parallel (or substantially-parallel) metal gratings, e.g., rectangular electrodes. Within the combination of the IR detector 100, however, the RF resonator 110 and the MM absorber 120 share top and bottom electrodes, where the top electrode is actually the MM layer, and a common piezoelectric material layer therebetween.

In various embodiments, the piezoelectric material of the resonator body 104 may be aluminum nitride (AlN), gallium nitride (GaN), or quartz, the bottom electrode 102 made of platinum, and the MM structures 126 may be made of aluminum. Additional material combinations are envisioned, however. For example, the piezoelectric material may further include lithium Niobate, PZT, zinc oxide (ZnO), or molybdenum disulfide ($MoS_2$), and the electrode layers may include molybdenum or gold.

The IR detector 100 may further include a pair of anchors 105A and 105B that are extensions of the thin film resonator body 104, which may be mechanically suspended over a semiconductor substrate. Each of the anchors 105A and 105B may include one or both of a first metal lead 107A and a second metal lead 107B. In the illustrated example of FIG. 1C, for example, the first metal lead 107A, which may carry an input to the bottom electrode 102, may pass below the thin film resonator body 104 portion of the anchor 105A, which may include a via 108 through which passes some of the metal from the first metal lead 107A. Furthermore, the second metal lead 107B may pass over the thin film resonator body 104 portion of the anchor 105B to carry an output of the IR detector 100.

Figure 1D:
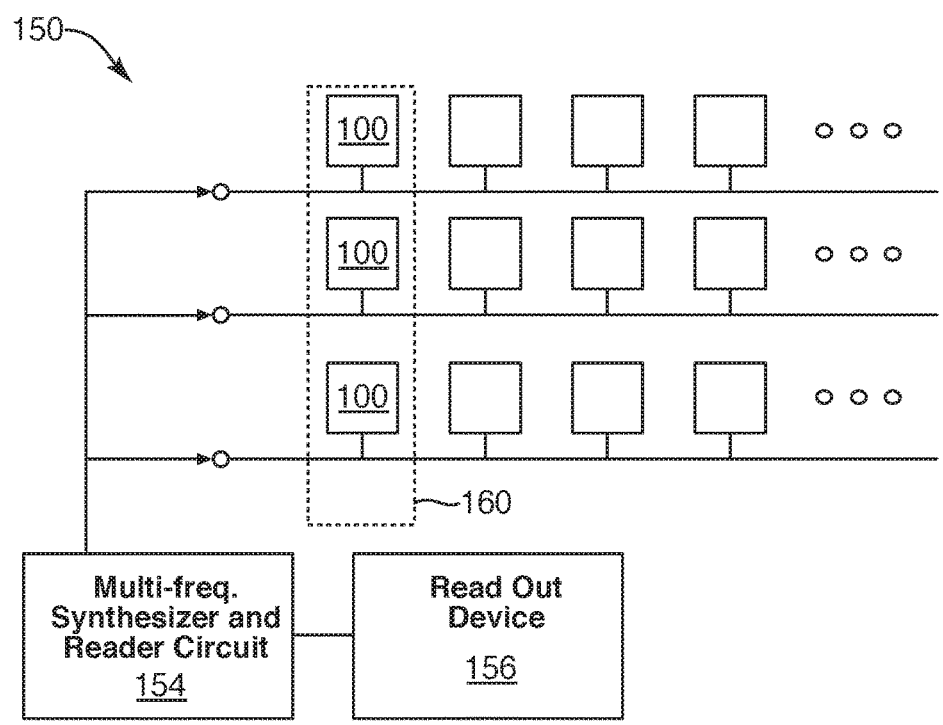
FIG. 1D is block diagram of a plurality of IR detectors (such as the IR detector in FIG. 1C) in a multiplexed array, according to embodiments of the present disclosure.

The combination of the MM absorber 120 (FIG. 1A) with the RF resonator 110 (FIG. 1B), as arranged in the IR detector 100 of FIG. 1C, may enable frequency selection in the IR detector 100, e.g., by taking advantage of the shape and periodicity of the MM structures 126 to select absorption wavelength, thus creating an inexpensive process that is CMOS compatible. Furthermore, as illustrated in FIG. 1D, creating an array 150 of the IR detectors 100 for multiplexed IR wavelength detection may provide a way to detect multiple IR wavelengths depending on which IR detectors 100 within the array are triggered by incident IR radiation. The array 150 may include a plurality of identical IR detectors in each column 160, and each column of IR detectors may slightly differ in observation RF frequency at which IR detection is triggered. A multi-frequency synthesizer and reader circuit 154 may receive detection signals from one or more rows of the IR detectors, and synthesize the detected IR wavelengths into a combined signal, which may be output to a readout device 156 coupled to the multi-frequency synthesizer and reader circuit 154.

The disclosed IR detector 100, array 150 of IR detectors 100, and the other IR detectors disclosed herein may be useful in a variety of applications, such as IR sensors and IR imaging needs. The disclosed IR detectors may provide unprecedented sensitivity of infrared radiation at room temperature. Furthermore, the disclosed IR detectors can be readily scaled into focal plane arrays, monolithically integrable on top of CMOS readout integrated circuits. The spectral selectivity of the disclosed IR detectors may also allow for low-cost, mid-IR multi-color imaging that is still inaccessible in the marketplace.

In operation, the time-varying electric field introduced by the top electrode 106 can excite the piezoelectric thin film of the resonator body 104 into lateral vibration, with a resonant frequency determined by the stiffness of the stacked layers of the IR detector and the IR resonator's physical dimensions. The IR resonator's resonant frequency may be highly sensitive to temperature variations due to the high temperature coefficients of aluminum nitride (ALN) and other similar materials.

When integrated into a read-out circuit, the IR resonator 100 may be able to output a voltage that scales linearly with temperature over a 26K range in the local temperature of the resonator. Upon absorption of incident radiation, the subsequent heating of the IR detector 100 may be measured in a shift of the output voltage, linearly dependent on the absorbed power. The MM absorber 120 may be integrated directly into the IR resonator 100, using the resonator leads 107A and 107B as optical elements in the IR detector's MM layer.

In various embodiments of the IR detector 100, an IR perfect absorber may include a patterned top layer (e.g., the MM structures 126), designed to give a resonant effective permittivity, separated from a metallic ground plane via a dielectric spacer, e.g., the thin film resonator body 106. While the effective permittivity is controlled by the design of the top metallic layer (e.g., a width and distance between the MM structures 126), the effective permeability of the IR detector 100 may result from a magnetic dipole generated by antiparallel surface currents on the top and bottom metal layers, and can be controlled by the dielectric spacer thickness, e.g., the thickness of the piezoelectric material of the resonator body 104. The resulting emission from the electric and magnetic dipoles, at resonance, destructively interferes, giving perfect (or near perfect) absorption. With such a design approach, strong, spectrally-selective absorption can be achieved, with absorption efficiencies, at resonance, close to 100%, and high reflectivity (>90%) at all other wavelengths. Moreover, the optical-resonance of the MM thin-film (of the top electrode 106) may be directly hybridized with the IR detector's mechanical resonance.

The proposed system can successfully surmount the technical hurdles associated with the majority of state-of-the-art mid-IR detectors, and features the following technological advantages in enabling record-breaking responsivity and noise equivalent power at low cost. For example, the IR detector 100 may be a hundred times more sensitive than the state-of-the-art room temperature, mid-IR detector in the same wavelength range, includes spectral selectivity, and is capable of differentiating mid-IR radiation with great wavelength resolution. The disclosed IR detector 100 may also be polarization sensitive, and be a hundred times faster than state-of-the-art room temperature, mid-IR detectors.

Figure 2A:
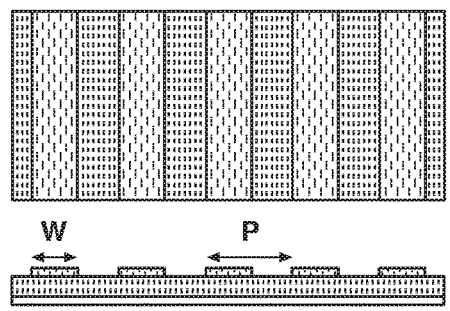
FIG. 2A is an image illustrating a one-dimensional mid-IR metamaterial layer, according to embodiments of the present disclosure.
Figure 2B:
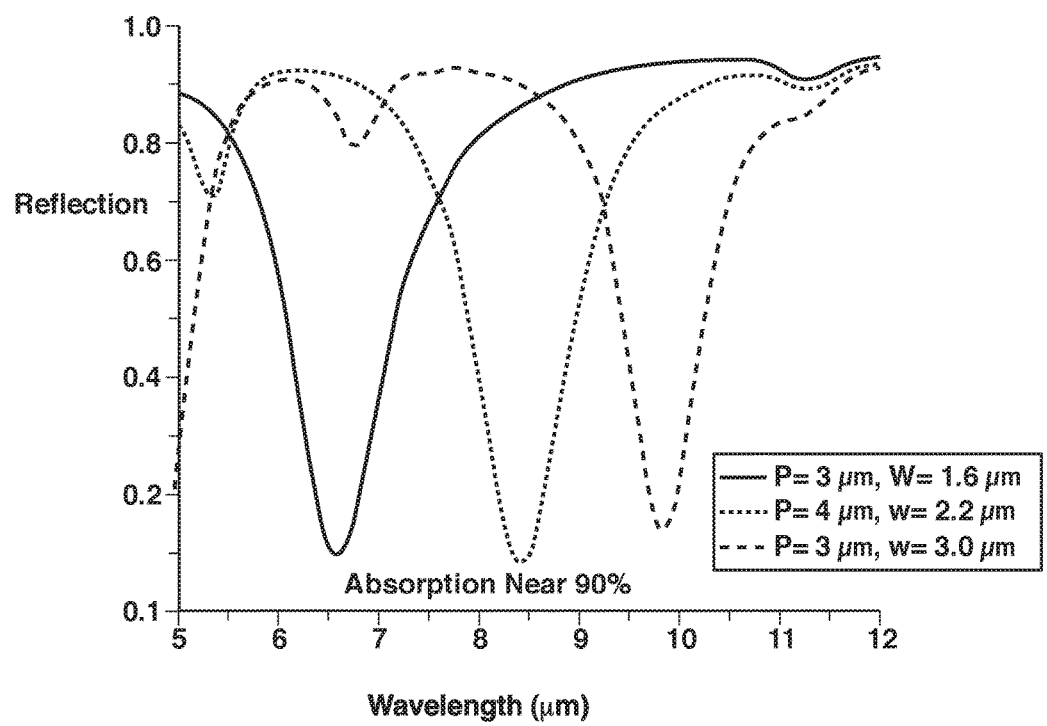
FIG. 2B is a graph illustrating measured reflectivity (or 1-absorption) of the one-dimensional mid-IR metamaterial layer of FIG. 2A.

FIG. 2A is an image illustrating a one-dimensional mid-IR metamaterial layer, according to embodiments of the present disclosure. This embodiment is similar to the grating of the MM structures 126 illustrated in FIG. 1B. FIG. 2B is a graph illustrating measured reflectivity (or 1-absorption) of the one-dimensional mid-IR metamaterial layer of FIG. 2A.

Figure 2C:
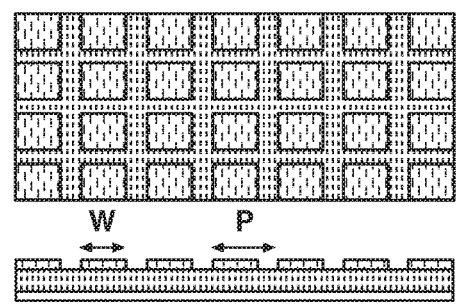
FIG. 2C is an image illustrating a two-dimensional mid-IR metamaterial layer, according to embodiment of the present disclosure.
Figure 2D:
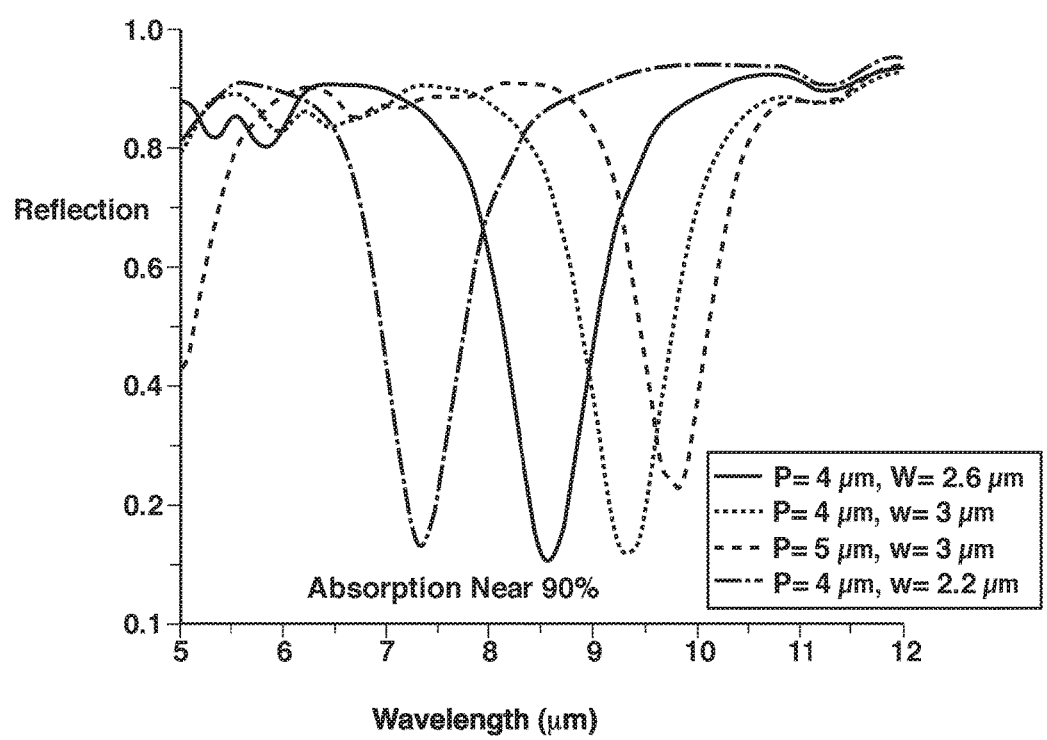
FIG. 2D is a graph illustrating measured reflectivity (or 1-absorption) of the two-dimensional mid-IR metamaterial layer of FIG. 2C.

FIG. 2C is an image illustrating a two-dimensional mid-IR metamaterial layer, according to embodiment of the present disclosure. In this embodiment, the plurality of MM structures 126 are further partitioned in the lateral direction, forming a patchwork of MM structures. The patchwork may include rows and columns of identical (or substantially identical) square MM structures 126, which in different embodiments may be substantially square, rectangular, or of a different shape such as circular or oval. FIG. 2D is a graph illustrating measured reflectivity (or 1-absorption) of the two-dimensional mid-IR metamaterial layer of FIG. 2C. Note that the width (W) of the MM structures and the periodicity (P), e.g., the length between adjacent MM structures, are both indicated in FIGS. 2A and 2C.

Figure 3A:
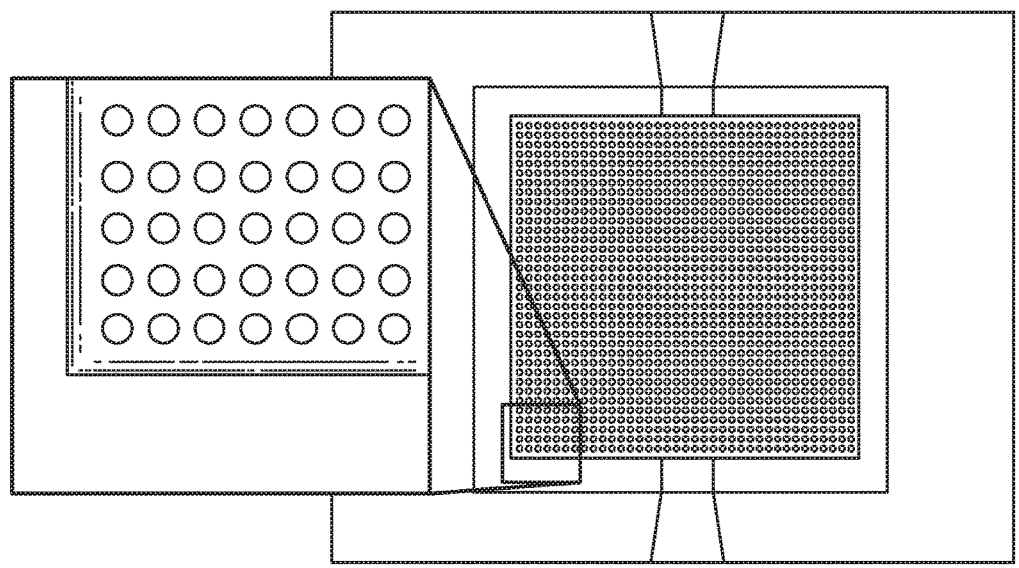
FIG. 3A is a converted scanning electron microscope (SEM) image of an embodiment of the disclosed IR detector, according to an embodiment of the present disclosure.
Figure 3B:
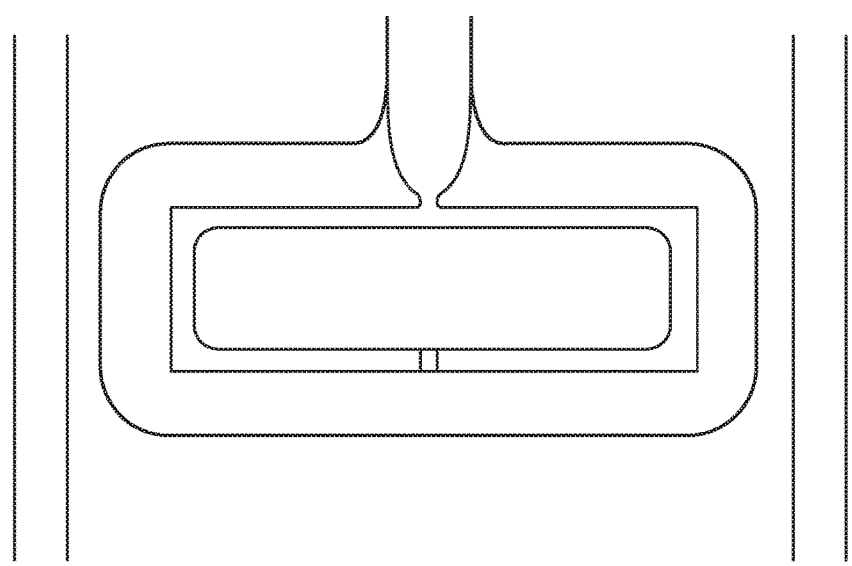
FIG. 3B is a converted optical image of an embodiment of the disclosed IR detector, according to an embodiment of the present disclosure.

FIG. 3A is a converted scanning electron microscope (SEM) image of an embodiment of the disclosed IR detector, according to an embodiment of the present disclosure. The IR detector of FIG. 3A includes a metamaterial that is polarization insensitive. Instead of strips, the metamaterial is made up of rows and columns of metal dots on the top surface. FIG. 3B is a converted optical image of an embodiment of the disclosed IR detector having a more rectangular shape.

In the present disclosure, resonant detectors based on the integration of NEMS/MEMS structures and metamaterial (MM) IR absorbers have been developed featuring high response speed and excellent spectral selectivity simultaneously in uncooled ambiance. Since IR radiation can be emitted in a range of polarizations as well as wavelengths, a polarization-sensitive MM design is incorporated to further improve the detection contrast. Exploiting the comparable wavelengths of long-wavelength mid-IR and radio frequency acoustic waves, the design of these IR detectors seamlessly hybridizes the near perfect absorption of polarized infrared irradiance and the resonant detection in the acoustic domain. The structural similarity between the MM absorber and NEMS/MEMS RF resonators allows the co-fabrication of both with little complication. The disclosed design also uses a readout circuit that outputs a DC voltage with a linear relationship to the incident IR power. The disclosed IR detectors have been demonstrated with a fast response time of 400 μs and high spectral selectivity with a full width half maximum (FWHM) of 1.02 μm, although this performance is expected to improve with further development.

FIG. 4A is a diagram of the disclosed IR detector 400 in which the metamaterial layer is a continuous metal line having a plurality of switchback folds, according to an embodiment of the present disclosure. In one embodiment, the IR detector 400 may include a bottom electrode 402, a thin film resonator body 404 made of a piezoelectric material and mechanically suspended over a semiconductor substrate 401, and an MM layer 406 (e.g., top layer) made of a plurality of MM structures 426.

In various embodiments, the IR detector 400 may further include a pair of anchors 405A and 405B that are extensions of the thin film resonator body 404, which may be attached to the semiconductor substrate 401. In these embodiments, the anchors 405A and 405B may include corresponding leads 407A and 407B that pass under the anchors 405A and 405B, respectively, and connect to the bottom electrode 402. A first lead 407A may terminate at an RF signal probe pad 409A, which receives an RF signal, and the second lead 407B may terminate at a ground probe pad 409B, which connects to a ground or a ground signal.

Figure 8A:
FIG. 8A is a set of fabrication process steps to manufacture an IR detector, according to an embodiment of the present disclosure.
Figure 8A:
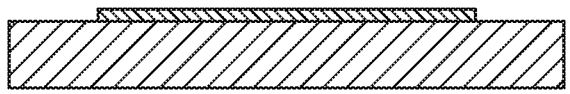
Figure 8A:
Figure 8A:
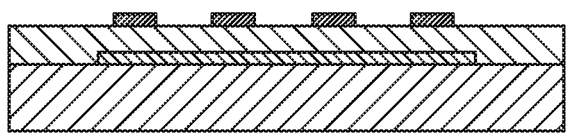
Figure 8A:
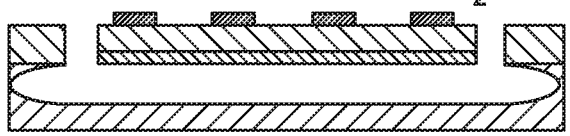
Figure 8A:
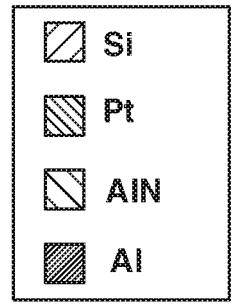

In one embodiment, the bottom electrode 402 includes a first electrode with a first set of fingers and a second electrode with a second set of fingers interdigitated with the first set of fingers, forming an interdigitated electrode. The interdigitated electrode may be suspended over a cavity 425 defined within the semiconductor substrate 401 during a release etching step (FIG. 8A). The MM structures 426, in one embodiment, may be supplied by a continuous metal line defining a plurality of switchback folds, where each switchback fold defines one of the MM structures 426. The continuous metal line may terminate with signal leads connected to a pair of direct current (DC) probe pads 415A and 415B. The DC probe pads 415A and 415B may be attached to the semiconductor substrate 401, and may facilitate testing the IR detector 400. In some embodiments, the DC probe pads, being extensions of the MM layer 406, may be considered to be a part of the anchors 405A and 405B, respectively.

FIG. 4B is a transverse cross-sectional view of a magnetic field of the thin film resonator body 404 between the MM layer 406 and the bottom electrode 402 of the disclosed IR detector 400, using rigorous coupled wave analysis (RCWA), according to embodiments of the present disclosure. FIG. 4C is a longitudinal cross-sectional view of a simulated lateral acoustic displacement mode shape of the disclosed IR detector 400, according to embodiments of the present disclosure.

With further reference to FIG. 4A, the disclosed IR detectors 100 and 400 in the present disclosure include the thin film resonator body 404. In one embodiment, the thin film resonator body 404 may be a suspended piezoelectric ALN thin film sandwiched by the patterned MM layer 406 and optically-thick bottom electrode 402. In one embodiment, the bottom electrode 402 may be a pair of interdigitated electrodes. The IR detector thus defines a suspended film stack having the dual function of capturing and dissipating nearly 100% of incident mid-IR radiation and confining piezo-electrically excited acoustic vibration for resonant readout.

Figure 5A:
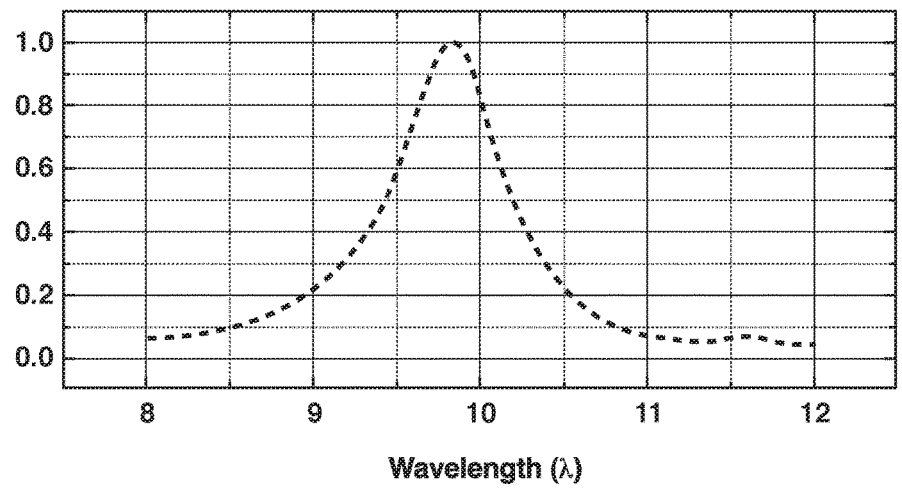
FIG. 5A is a graph illustrating a simulated metamaterial using RCWA, according to embodiments of the present disclosure.

In the optical domain, the MM layer 406 combined with the thin film resonator body 404 may form a mid-IR metamaterial that has previously been demonstrated with near perfect absorption, high spectral selectivity, angular insensitivity, and lithographically defined absorption peaks. The metamaterial performs impedance matching to incident IR radiation to minimize reflection and maximize absorption of a particular IR wavelength. The impedance matching may be accomplished by optimally setting characteristics of the IR detectors that affect the effective permittivity and permeability for the disclosed IR detectors. For example, the effective permittivity may be controlled by the dimensions of the MM structures 426 of the MM layer 406, e.g., a width of the MM structures and a distance between the MM structures. The effective permeability, resulting from the magnetic dipoles generated by the anti-parallel surface currents on the MM layer 406 and the bottom electrode 402, may be set by the thickness of the piezoelectric material of the thin film resonator body 404. The MM layer 406 may thus be configured and sized to create a polarization-sensitive metamaterial layer. At targeted wavelengths where impedance is perfectly matched, near 100% of incident plane waves polarized perpendicularly to the strips are absorbed and dissipated within the disclosed IR detectors (FIG. 5A).

For the acoustic functionality, the two bottom electrodes 402, one connected to an RF signal and the other to ground, serve to create an oscillating electric field in the suspended AlN film of the thin film resonator body 404. The MM layer 406 with floating potential helps to orient the electric field vertically in the AlN film to excite lateral vibration through the $d_{31}$ piezoelectric coefficient. The displacement mode shape of the excited lateral vibration is shown in FIG. 4C. The acoustic resonance may be determined by the lateral dimension of the electrodes, $W_{Pt}$, and the acoustic phase velocity, $v_p$, in the resonator stack, or $$f_s = \frac{v_p}{2W_{Pt}},$$

Figure 5B:
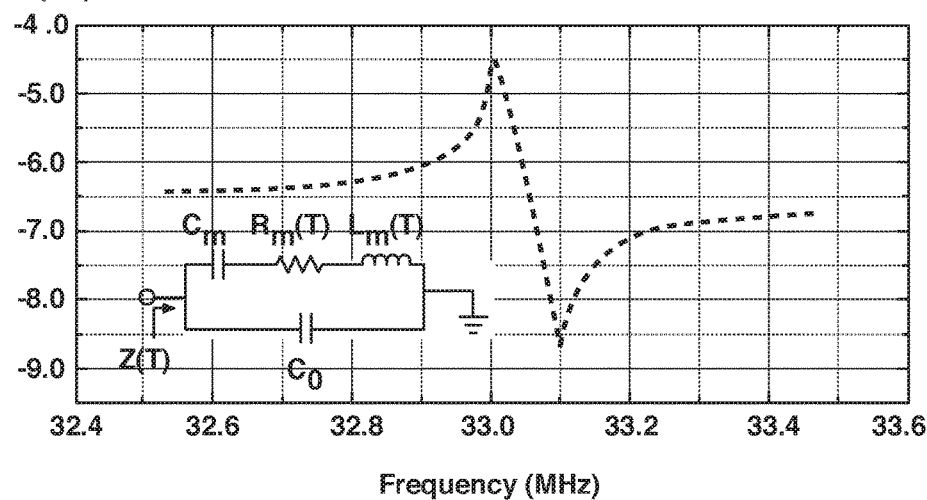
FIG. 5B is a graph illustrating admittance of a typical resonator represented by inset Butterworth-Van Dyke (MBVD) model.

An equivalent circuit shown in the inset of FIG. 5B may be used to capture the admittance response of the IR detector 400. The response features a series and parallel resonance, between which an abrupt transition from low to high impedances occurs. Due to the dependence of the elasticity of sputtered ALN films on temperature, the series resonance also exhibits excellent intrinsic sensitivity to temperature, as characterized by the temperature coefficient of frequency (TCF=−30 ppm/K). Such sensitivity may be leveraged with reference to this disclosure to develop an extremely sensitive, thermal detector with a corresponding readout circuit.

Figure 6:
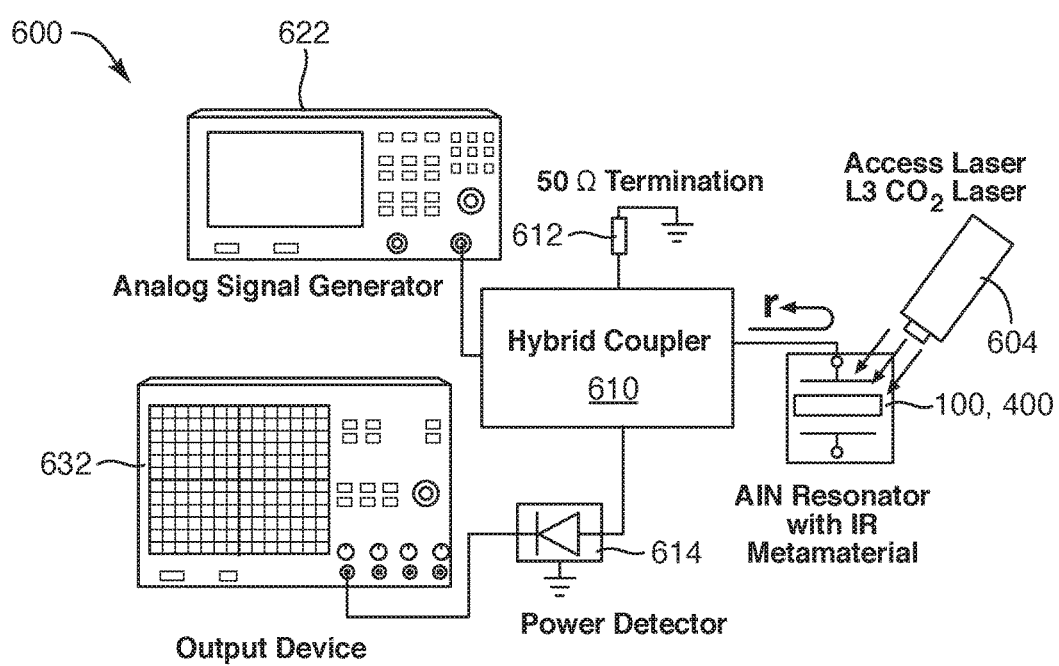
FIG. 6 is a schematic diagram of a readout circuit, to read out incident infrared waves on the disclosed IR detector, according to an embodiment of the present disclosure.

FIG. 6 is a schematic diagram of an IR detector readout circuit 600, to read out incident infrared waves on the disclosed IR detectors 100 and 400, according to an embodiment of the present disclosure, where the IR detector 400 is hereinafter referenced for simplicity of explanation. The IR detector readout circuit 600 may include an access laser 604 (to create incident mid-IR radiation at a known frequency for purposes of testing), a hybrid coupler 610 coupled to the IR detector 400, an impedance matching terminator 612, a power detector 614, an low-power analog signal generator 622, and an output device 632 such as a signal oscilloscope or equivalent integrated circuit measuring device.

Figure 7A:
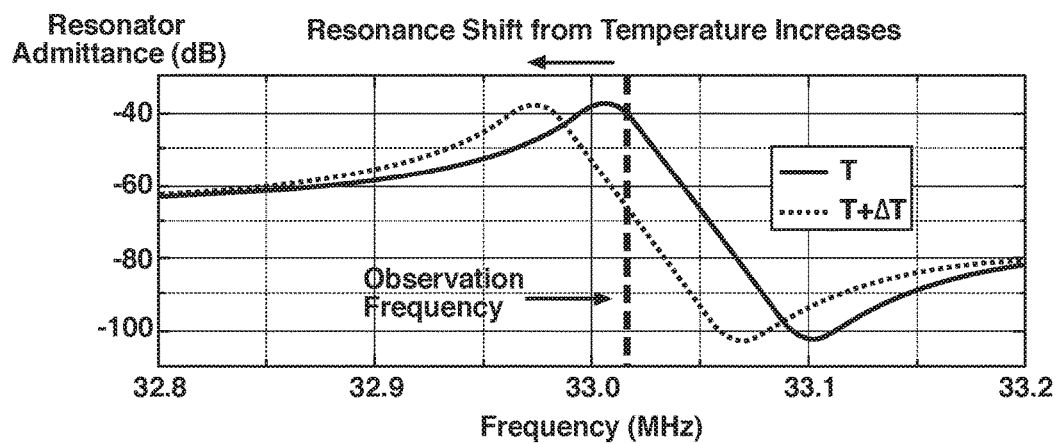
FIG. 7A is a graph representation of a temperature dependent shift in the admittance of the disclosed IR detector, according to an embodiment of the present disclosure.

The incident mid-IR radiation absorbed by the IR detector 400 detector causes an increase in temperature, which in turn decreases the acoustic resonant frequency due to the thermal expansion and general softening of the device materials. As illustrated in FIG. 7A, when the resonant frequency decreases, there is a change in resonator impedance at an observation RF frequency. If probed at the observation RF frequency, the detector impedance results in a temperature-dependent impedance mismatch (F) between the detector and the readout circuit.

Figure 7B:
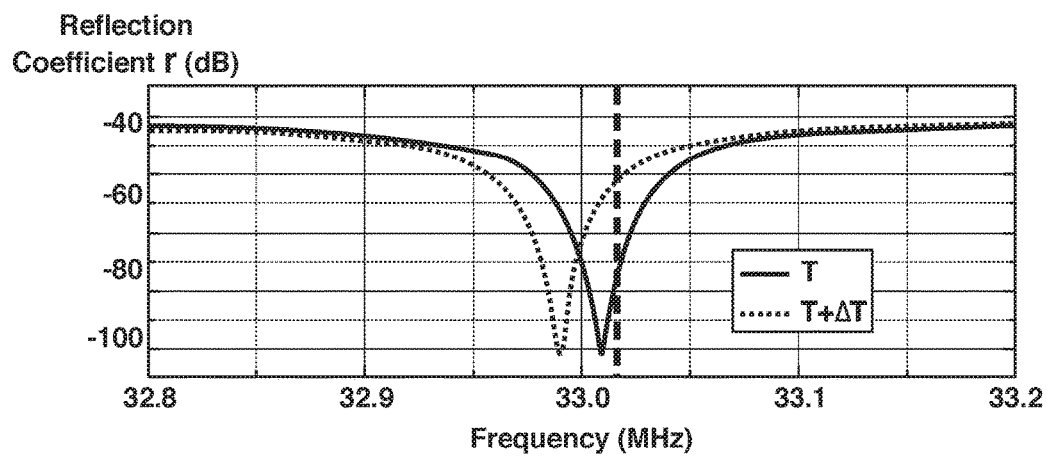
FIG. 7B is a graph representation of a temperature dependent shift in the reflection coefficient of the disclosed IR detector, according to an embodiment of the present disclosure.

In various embodiments, to read out the impedance mismatch, the low-power signal generator 622 provides an RF signal at an observation frequency through the hybrid coupler 610 to the IR detector 400. The reflected power is sent back into the hybrid coupler 610 and passed to the power detector 614 that outputs a voltage offset with an inverse logarithmic relation to the power of the reflected signal. Since the magnitude of the reflection coefficient is logarithmically proportional to frequency (and therefore temperature) near resonance (FIG. 7B), the voltage offset at the output of the power detector 614 has a linear relationship with incident IR power, which can be read out by the output device 632. The disclosed IR detector readout circuit 600 may be reconfigured to measure multiple IR detectors simultaneously with a single input signal, allowing for the generation of multiplexed focal-plane array imaging.

In some embodiments, the IR detector performance may be characterized by its responsivity and speed at the designed wavelength. The responsivity of the IR detector 400, defined as $R_v = \Delta V(\Delta Z)/P_{inc}$ is a measure of how efficiently incident IR radiation, $P_{inc}$, can be translated into an impedance change $\Delta Z$ and subsequently a voltage offset $\Delta V(\Delta Z)$ at the output of the power detector. To achieve maximum impedance change relative to temperature, the observation frequency is chosen between the series and parallel resonances where the change in impedance with respect to frequency is the greatest (FIG. 5B). The amount of impedance change can be analyzed using the modified Butterworth-van-Dyke model of a resonator:

$$Z(\omega_o, Q, T) = \frac{1}{j\omega_o C_0} // \left( R_m(Q,T) + j\omega_o L_m(Q,T) + \frac{1}{j\omega_o C_m} \right), \quad (1)$$

where Z is the IR detector impedance at observation frequency $\omega_o$ and temperature T, Q is the quality factor and $R_m$, $L_m$, and $C_m$ are the motional resistance, inductance, and capacitance respectively of the IR detector 400. To quantitatively capture the sharp impedance change with respect to temperature, the temperature coefficient of impedance (TCZ) of the IR detector is introduced. The TCZ may be analogous to the temperature coefficient of resistance (TCR) used in microbolometers and is defined as the percentage change of impedance at the observation frequency per temperature variation:

$$TCZ(\omega_o, Q, T) = \frac{f_s}{z(\omega_o, Q, T)} \frac{\partial Z(\omega_o, Q, T)}{\partial f_s} \cdot TCF. \quad (2)$$

For high Q resonators, the rapid impedance transition between series and parallel resonances is enhanced, resulting in a high TCZ and a corresponding high responsivity which can be rewritten in terms of TCZ as:

$$R_V(Q) = \frac{\Delta V}{P_{inc}} = \frac{G \cdot TCZ(Q) \cdot \Delta T}{P_{inc}}. \quad (3)$$

where G is a constant related to the voltage gain of the readout circuit. Therefore, unlike microbolometers that have relatively fixed TCRs, the responsivity of the IR detector 400 may be significantly improved by an increased resonator Q. The speed of the IR detector 400 may be determined by the device thermal dynamics. The IR detector 400 in the disclosed design is suspended by the anchors 405A and 405B made of a film stack of Pt, AlN, and/or Al. In addition to allowing minimally damped acoustic vibration in the IR detector 400, the anchors 405A and 405B may serve to regulate heat flow in the detector. Fast detector response is enabled by a low thermal time constant, $T_{th}=C_{th}/G_{th}$, which is defined as the ratio of thermal capacitance and thermal conductance. The combination of the high thermal conductivity of AlN and the extremely low thermal mass of the ultrathin (350 nm) suspended thin film resonator body 404 may be leveraged to yield sub-millisecond thermal time constants.

Additional features are also included in the device for testing calibration purposes. For instance, the MM structures 426 may be configured into a serpentine trace having a plurality of switched back electrodes, as illustrated in FIG. 4A, terminating in the DC probe pads 415A and 415B. The DC probe pads 415A and 415B of the serpentine trace may enable the application of a DC current to heat the IR detector 400 in addition to enhancing IR absorption. This current heating may provide an additional method for characterizing the thermal properties of the resonator besides laser heating. The current heating may also be used to illuminate the device under test (DUT) under the thermal camera for the purpose of alignment.

Collectively harnessing the spectrally selective absorption of metamaterials (MM), thermally-sensitive impedance near acoustic resonance, and the disclosed IR detector readout circuit 600, the IR detectors 100 and 400 show excellent promise for fast, highly sensitive detection and deployment in focal plane imaging arrays.

TABLE I

| Feature | Detector Component | | |
|---|---|---|---|
| | Material | Dimension | Value (μm) |
| MM Layer for Metamaterial Absorption | Al | Length | 200 |
| | | Width ($W_{Al}$) | 2.2, 2.6, 3.4 |
| | | Pitch ($P_{Al}$) | 4, 4, 5 |
| | | Thickness | 0.06 |
| Piezoelectride Body | AlN | Length | 200 |
| | | Width | 200 |
| | | Thickness | 0.22 |
| Bottom Electrodes for Acoustic Excitation | Pt | Length | 200 |
| | | Width ($W_{Pt}$) | 95 |
| | | Thickness | 0.08 |
| Anchor | Combo of Pt/AlN or Pt/AlN/Al | Length | 100 |
| | | Width | 18 |
| | | Thickness | 0.06, 0.22, 0.08 |

To demonstrate the IR detector technology, representative prototypes were fabricated with the design parameters listed in Table. I. Three MM layer configurations, with the strip widths, $W_{Al}$, and pitches, $P_{Al}$, were implemented to absorb across a range of the long-wave-IR (8-12 μm) spectrum. One bottom electrode configuration is selected to enable an acoustic resonance at 33.2 MHz. The relatively low resonant frequency is chosen because higher Qs can be experimentally obtained for lower frequency devices, and the resonant frequency does not directly influence the responsivity in the disclosed readout. Based on the previously disclosed IR detector design, the rest of the design parameters are selected to enable a favorable tradeoff between detector responsivity and speed, with additional considerations for fabrication limitations.

Figure 8B:
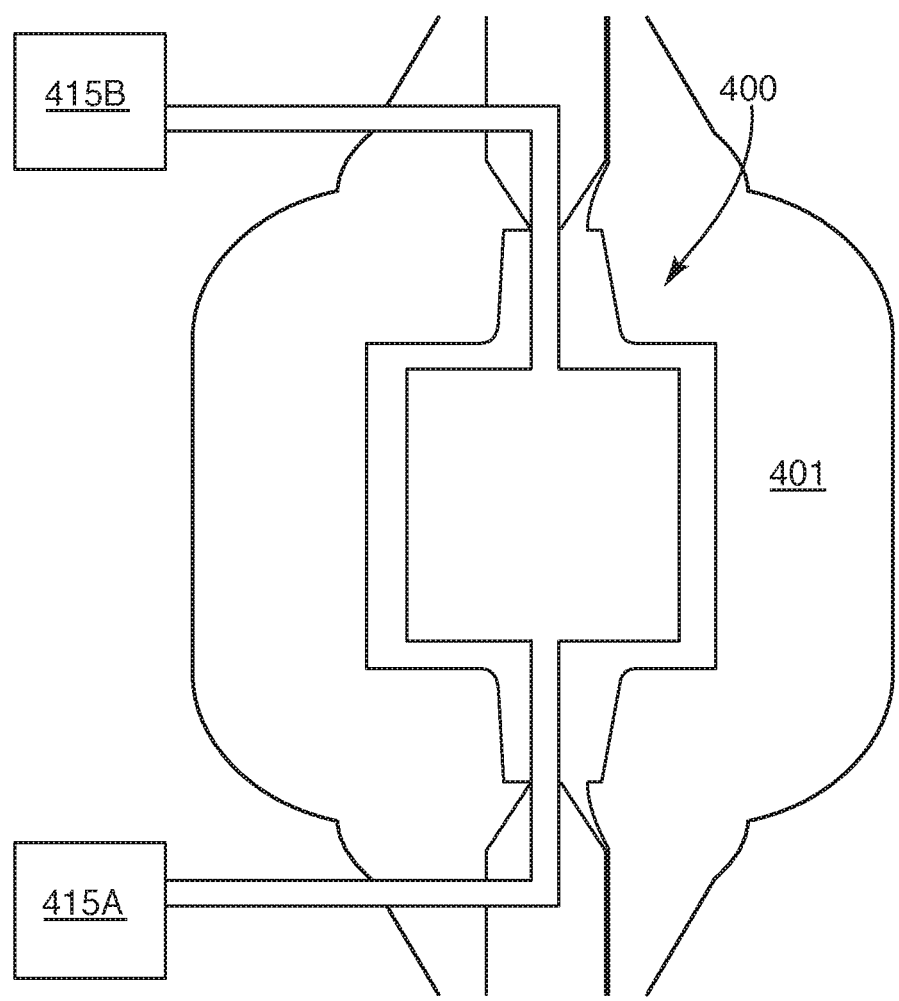
FIG. 8B is an SEM image of the disclosed IR detector, according to an embodiment of the present disclosure.
Figure 12A:
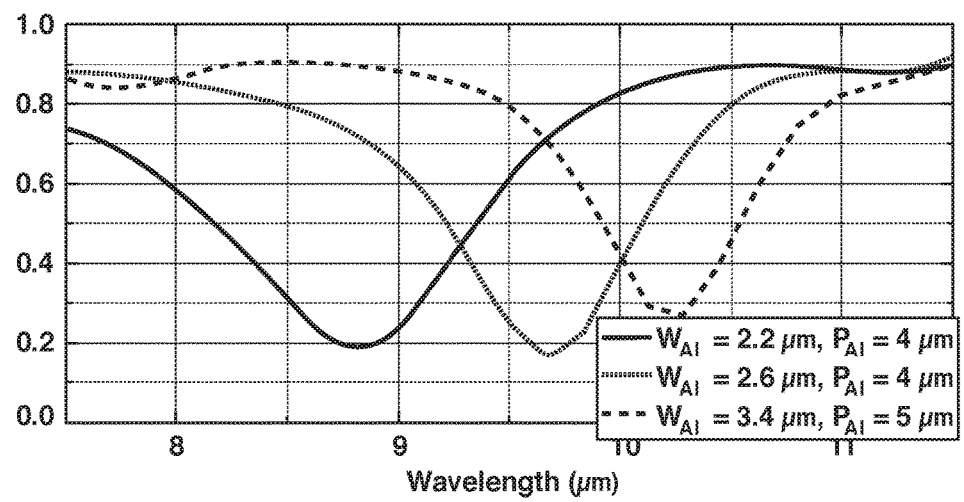
FIG. 12A is a graph of measured reflectance of the disclosed IR detectors with metamaterial spanning the mid-IR spectrum, according to an embodiment of the present disclosure.
Figure 12B:
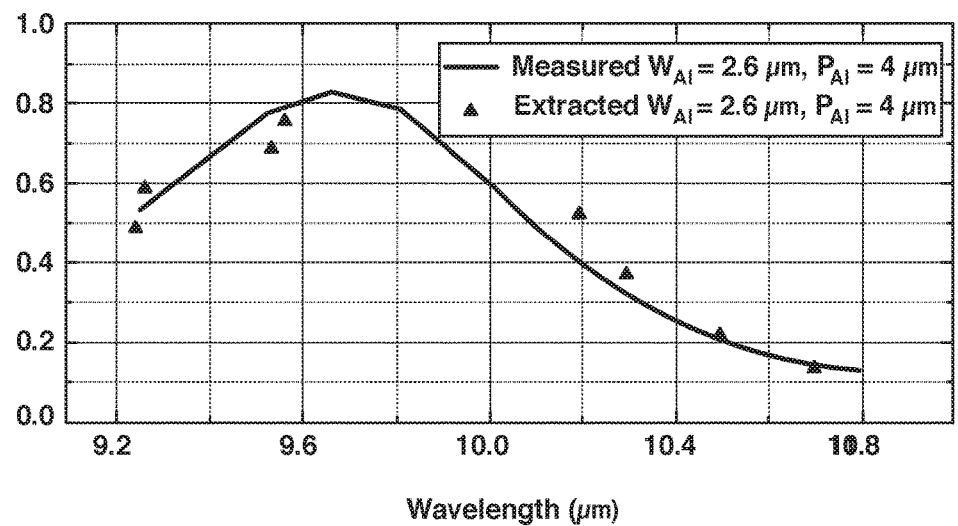
FIG. 12B is a graph of comparison of the measured and extracted absorptance of a single IR detector device as a function of the wavelength of the incident laser, according to an embodiment of the present disclosure.

FIG. 8A is a set of fabrication process steps to manufacture the IR detector 100 or 400, according to an embodiment of the present disclosure. FIG. 8B is an SEM image of the disclosed IR detector 100 or 400, according to an embodiment of the present disclosure. A high-resistivity silicon (Si) wafer may first to patterned by photolithography (1). Next, a 80 nm thick platinum (Pt) electrodes may be deposited by evaporation and defined by liftoff (2). Next, a 220 nm high quality, c-axis oriented, AlN layer may be sputtered onto the wafer (3). Next, a 60 nm-thick aluminum (Al) layer may be patterned by lithography into multiple MM layer configurations designed to span the mid-IR spectrum by deposition by sputtering and then being defined by liftoff (4). Next, the resonator body may be defined using reactive ion etching with inductively coupled plasma and then be released by a xenon difluoride (XeF2) dry etch (5). Significant warping may occur due to the stress developed during the deposition of the ultrathin AlN thin film, and likely dampened the Q. Although multiple devices may be fabricated with distinct electrode widths and pitches designed to span the mid-IR spectrum, for the purpose of concise discussion, a single device with $W_{Al}=2.6$ μm and $P_{Al}=4$ μm is demonstrated. Other detectors showed similar performance with the exception of a shift in peak absorption resonance as shown in FIGS. 12A and 12B.

The detector performance was measured using the readout circuit illustrated in FIG. 6. An Access Laser L4G CO2 laser operating in either pulsed or continuous wave form was used to illuminate the IR detector 400 DUT, with alignment of the laser beam spot to the DUT conducted using a commercial IR camera. The total laser power was measured by placing a ZnSe beam splitter in the optical path and measuring the power split to a Thorlabs S302V broadband power meter. From the total power, the incident power density was extracted by measuring the beam profile using a razor-blade technique.

Figure 9A:
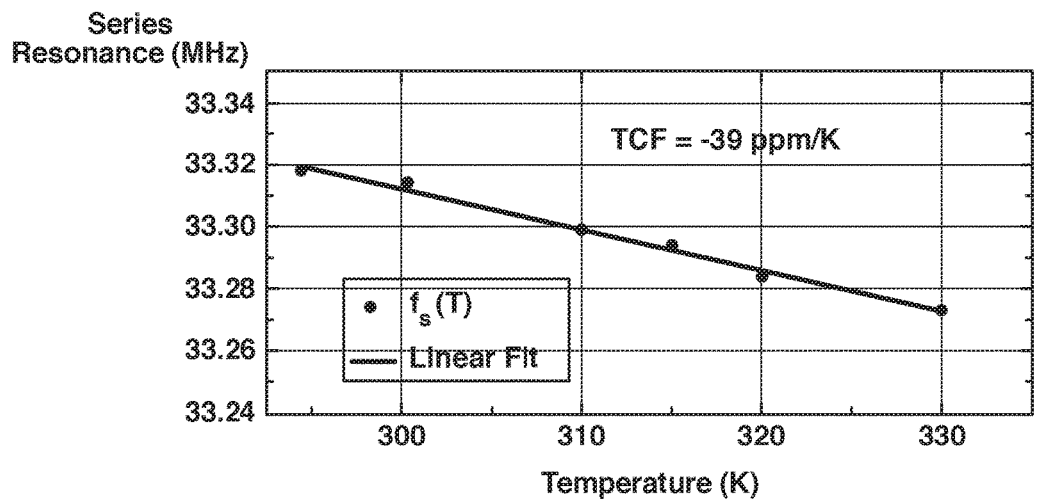
FIG. 9A is a graph of measured variation of series resonant frequency with respect to temperature of the disclosed IR detector, according to an embodiment of the present disclosure.
Figure 9B:
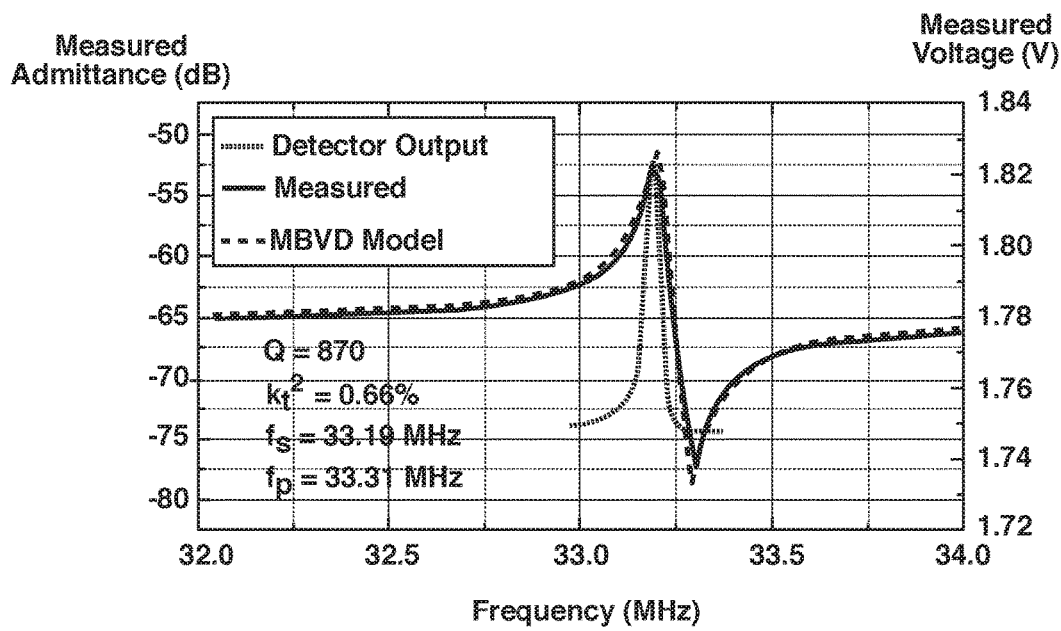
FIG. 9B is a graph of detector voltage response compared to resonator electromechanical performance of the disclosed IR detector, according to an embodiment of the present disclosure.

Characterization of the electromechanical performance of the fabricated IR detector 400 was conducted using an Agilent N5230A performance network analyzer (PNA) with the measured admittance of the resonator shown in FIG. 9B. Series and parallel resonance frequencies of 33.19 and 33.31 MHz respectively were measured. The resonator exhibited an extracted electromagnetic coupling coefficient, $k_t^2$, of 0.66% and moderate Q of 870 that was likely diminished by significant warping in the resonator. A large TCF value of −39 ppm/K was measured (FIG. 9A) in a vacuum using a temperature-controlled RF probe station. The difference in measured TCF from bulk AlN may be due to the temperature coefficients of elasticity of the relatively thick Pt and Al layers. The total IR detector output range was characterized by frequency sweeping the observation signal provided by the RF analog signal generator 622. Two linear regions exist on either side of series resonance, with the higher frequency region yielding slightly greater sensitivity due to the sharper impedance change between series and parallel resonance. Using the TCF measurement, a temperature range of 26 K over which the output voltage is linear was extracted. The IR detector 400 exhibits an extracted TCZ value of 9.6%, more than double the value of TCR found in state of the art microbolometers such as vanadium oxide (2-4%) and amorphous silicon (3%). Due to the intrinsically high quality factor of AlN MEMS (Q>4000), there is great potential for developing AlN IR detectors with even higher TCZ values and consequently enhanced responsivity.

Figure 10:
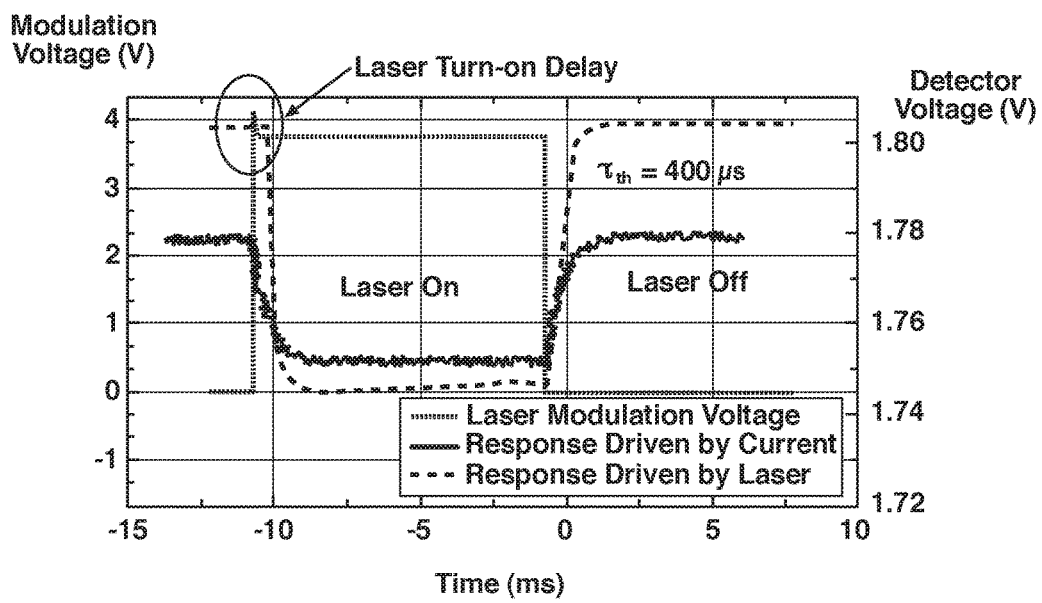
FIG. 10 is a graph of measured transient response of the disclosed IR detector with $W_{Al}=2.6$ μm and $P_{Al}=4$ μm to IR radiation with modulation frequency of 100 Hz and a duty cycle of 50%, according to an embodiment of the present disclosure.

Thermal time constant measurements were conducted by modulating the laser power and measuring the transient output voltage of the detector (FIG. 10). Additional measurements were conducted by applying a square wave voltage to the serpentine MM layer 406 in order to resistively heat it. The smaller magnitude voltage change during current heating was due to power handling limitations in the thin Al layer that was patterned into the MM layer high AlN thermal conductivity. Note that the laser heating time is faster than the cooling time due to a spike in the laser power near the beginning of each on cycle, and therefore, the thermal time constant was extracted from the cooling process.

Figure 11:
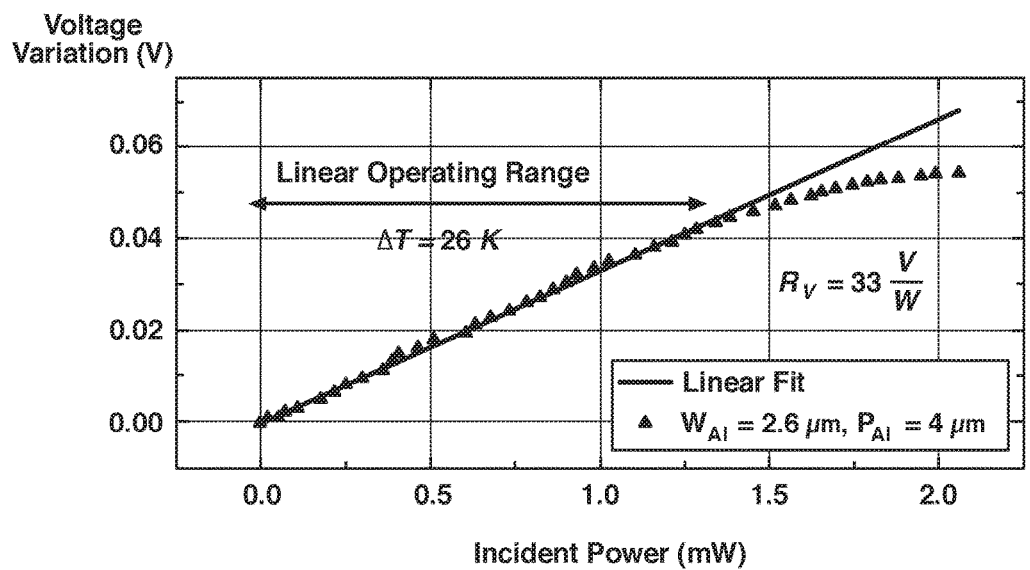
FIG. 11 is a graph of measured responsivity of the disclosed IR detector, according to an embodiment of the present disclosure.

The responsivity of the detector was characterized by increasing the incident power to the resonator at a constant 9.6 µm wavelength and measuring the corresponding change in detector output voltage as depicted in FIG. 11. Two KRS5 polarizers were placed consecutively in the beam path and their orientation relative to each other tuned to allow precise control of power to the resonator.

Multiple MM layer configurations were used to produce AlN-based IR detectors with peak absorption wavelengths spanning the mid-IR spectrum. The optical reflectance of the fabricated ALN IR devices was measured using a Bruker V80 Fourier Transform Infrared (FTIR) spectrometer from which the absorptance was determined as A=1−R. It is assumed that the transmission through the MM material of the MM layer 406 is negligible due the near complete coverage of the resonator bottom by optically thick Pt of the bottom electrodes 402. The measured absorptance from three resonators with different MM configurations in FIG. 12A demonstrates the lithographic control over absorption range. Excellent spectral selectivity, as characterized by the greater than 80% absorption with a FWHM of 1.02 µm at an optimized 9.6 µm was achieved. As illustrated in FIG. 12B, the FTIR measured absorptance of the $W_{Al}$=2.6 µm and $P_{Al}$=4 µm detector was also confirmed by the extracted spectral selectivity of the IR detector. Using the same setup shown in FIG. 6, the spectral selectivity was determined by first recording the detector output voltage (ΔV) as the $CO_2$ laser was tuned across its working range of 9.2 µm to 10.8 µm. Absorptance values were then extracted from the change in detector voltage at a fixed input power in conjunction with the measured responsivity as $A=\Delta V/R_V P_{inc}$). Excellent agreement between the measured and extracted absorption has been achieved, with a limited number of extracted values due to the moderate tuning range of the laser.

Figure 13:
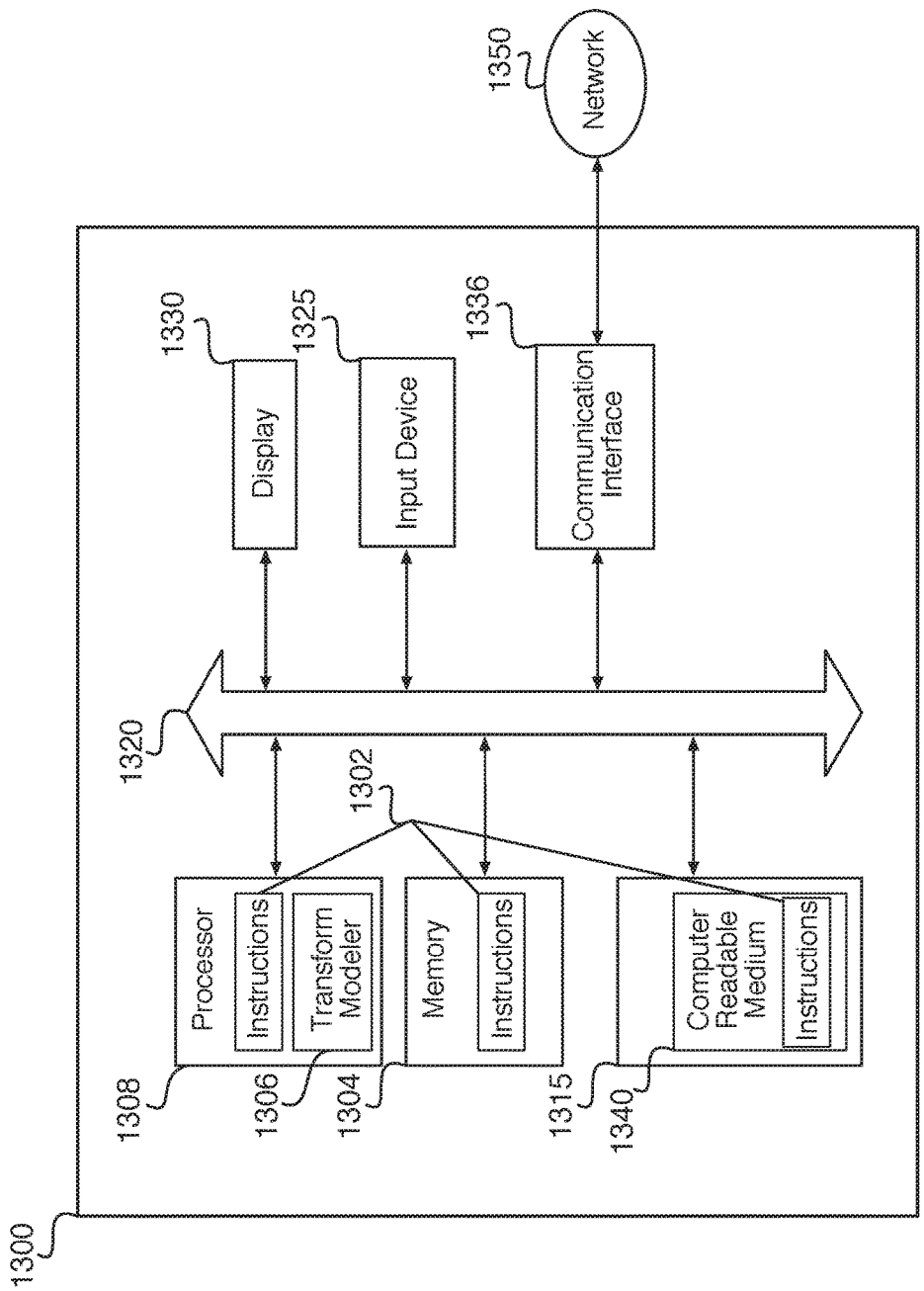
FIG. 13 illustrates a computer system, which may represent aspects of any computing device or system which is capable of executing the embodiments as disclosed herein.

FIG. 13 illustrates a computer system 1300, which may represent aspects of the computing device 100 or any other device or system which is capable of executing the embodiments as disclosed herein, e.g., as part or whole of any of the computing systems of FIG. 1D or FIG. 6. The computer system 1300 may include an ordered listing of a set of instructions 1302 that may be executed to cause the computer system 1300 to perform any one or more of the methods or computer-based functions disclosed herein. The computer system 1300 may operate as a stand-alone device or may be connected to other computer systems or peripheral devices, e.g., by using a network 1310.

In a networked deployment, the computer system 1300 may operate in the capacity of a server or as a client-user computer in a server-client user network environment, or as a peer computer system in a peer-to-peer (or distributed) network environment. The computer system 1300 may also be implemented as or incorporated into various devices, such as a personal computer or a mobile computing device capable of executing a set of instructions 1302 that specify actions to be taken by that machine, including and not limited to, accessing the internet or web through any form of browser. Further, each of the systems described may include any collection of sub-systems that individually or jointly execute a set, or multiple sets, of instructions to perform one or more computer functions.

The computer system 1300 may include a memory 1304 on a bus 1320 for communicating information. Code operable to cause the computer system to perform any of the acts or operations described herein may be stored in the memory 1304. The memory 1304 may be a random-access memory, read-only memory, programmable memory, hard disk drive or any other type of volatile or non-volatile memory or storage device.

The computer system 1300 may include a processor 1308, such as a central processing unit (CPU) and/or a graphics processing unit (GPU). The processor 1308 may include one or more general processors, digital signal processors, application specific integrated circuits, field programmable gate arrays, digital circuits, optical circuits, analog circuits, combinations thereof, or other now known or later-developed devices for analyzing and processing data. The processor 1308 may implement the set of instructions 1302 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility for computer processing.

The processor 1308 may include a transform modeler 1306 or contain instructions for execution by a transform modeler 1306 provided a part from the processor 1308. The transform modeler 1306 may include logic for executing the instructions to perform the transform modeling and image reconstruction as discussed in the present disclosure.

The computer system 1300 may also include a disk (or optical) drive unit 1315. The disk drive unit 1315 may include a non-transitory computer-readable medium 1340 in which one or more sets of instructions 1302, e.g., software, can be embedded. Further, the instructions 1302 may perform one or more of the operations as described herein. The instructions 1302 may reside completely, or at least partially, within the memory 1304 and/or within the processor 1308 during execution by the computer system 1300.

The memory 1304 and the processor 1308 also may include non-transitory computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 1300 may include an input device 1325, such as a keyboard or mouse, configured for a user to interact with any of the components of the computer system 1300. It may further include a display 1330, such as a liquid crystal display (LCD), a cathode ray tube (CRT), or any other display suitable for conveying information. The display 1330 may act as an interface for the user to see the functioning of the processor 1308, or specifically as an interface with the software stored in the memory 1304 or the drive unit 1315.

The computer system 1300 may include a communication interface 1336 that enables communications via the communications network 1310. The network 1310 may include wired networks, wireless networks, or combinations thereof. The communication interface 1336 network may enable communications via any number of communication standards, such as 802.11, 802.17, 802.20, WiMax, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein. Such a programmed computer may be considered a special-purpose computer.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present embodiments are to be determined by the broadest permissible interpretation of the following claims and their equivalents, and shall not be restricted or limited by the foregoing detailed description. While various embodiments have been described, it will be apparent to those of ordinary skill in the art that many more embodiments and implementations are possible within the scope of the above detailed description. Accordingly, the embodiments are not to be restricted except in light of the attached claims and their equivalents, now presented or presented in a subsequent application claiming priority to this application.

What is claimed is:

1. An infrared (IR) detector comprising:
   a combination of a radio frequency (RF) resonator and a metamaterial absorber, comprising:
   a bottom electrode to provide acoustic excitation;
   a piezoelectric layer connected to the bottom electrode and suspended over a cavity defined within a semiconductor substrate; and
   a top layer, comprising a mid-IR metamaterial, connected to the piezoelectric layer, wherein the top layer and the piezoelectric layer are sized to impedance match with a particular IR wavelength, to minimize reflection and maximize absorption of the particular IR wavelength, and thus make the top layer polarization sensitive to the particular IR wavelength.

2. The IR detector of claim 1, wherein to size the top layer and the piezoelectric layer to perform the impedance match is to:
   set a dimension of the top layer to produce an effective permittivity of the IR detector; and
   set a thickness of the piezoelectric layer to produce an effective permeability of the IR detector.

3. The IR detector of claim 2, wherein the top layer comprises a continuous metal line defining a plurality of switchback folds, and wherein the dimension that is set comprises at least one of a width of each switchback fold or a distance between the switchback folds of the plurality of switchback folds.

4. The IR detector of claim 2, wherein the top layer comprises a set of rectangular electrodes, and wherein the dimension that is set comprises at least one of a width of each rectangular electrode or a distance between each rectangular electrode of the set of rectangular electrodes.

5. The IR detector of claim 1, wherein the bottom electrode comprises platinum.

6. The IR detector of claim 1, wherein the top layer comprises aluminum.

7. The IR detector of claim 1, wherein the piezoelectric layer comprises one of aluminum nitride and gallium nitride, and wherein the IR detector is one of a micro-electro-mechanical (MEM) device or a nano-electro-mechanical (NEM) device.

8. The IR detector of claim 1, wherein the bottom electrode comprises a first electrode with a first set of fingers and a second electrode with a second set of fingers interdigitated with the first set of fingers.

9. The IR detector of claim 1, further comprising:
   a first anchor extending from a first end of the piezoelectric layer and attached to the semiconductor substrate, the first anchor including a first lead from the bottom electrode to an RF signal probe pad; and
   a second anchor extending from a second end of the piezoelectric layer and attached to the semiconductor substrate, the second anchor including a second lead from the top layer to a ground probe pad.

10. The IR detector of claim 1, wherein the RF resonator is dimensioned to exhibit a high quality factor (Q) and a low thermal time constant, to provide for rapid impedance transition between a series resonance and a parallel resonance.

11. An infrared (IR) detector array comprising:
    a plurality of IR detectors, wherein each IR detector is a combination of a radio frequency (RF) resonator and a metamaterial absorber, comprising:
    a bottom electrode to provide acoustic excitation; and
    a piezoelectric layer connected to the bottom electrode and suspended over a cavity defined within a semiconductor substrate; and
    a top layer comprising a mid-IR metamaterial and connected to the piezoelectric layer, wherein the top layer and the piezoelectric layer are sized to impedance match with a particular IR wavelength, to minimize reflection and maximize absorption of the particular IR wavelength, and thus make the top layer polarization sensitive to the particular IR wavelength; and
    a multi-frequency synthesizer and reader circuit coupled to each of the plurality of IR detectors and to a readout circuit, wherein, in response to receipt of incident IR radiation comprising a first IR wavelength and a second IR wavelength, the multi-frequency synthesizer and reader circuit is to:
    detect, from a first IR detector of the plurality of IR detectors, the first IR wavelength;
    detect, from a second IR detector of the plurality of IR detectors, the second IR wavelength; and
    synthesize and output a signal to the readout circuit, the signal including a synthesis of the first IR wavelength and the second IR wavelength of the incident IR radiation.

12. The IR detector array of claim 11, wherein the plurality of IR detectors are arranged in columns of identical IR detectors, wherein the first IR detector comprises a first column of first IR detectors, and wherein the second IR detector comprises a second column of second IR detectors.

13. The IR detector array of claim 11, wherein to size the top layer and the piezoelectric layer of each IR detector, to perform the impedance match, is to:
set a dimension of the top layer to produce an effective permittivity of the IR detector; and
set a thickness of the piezoelectric layer to produce an effective permeability of the IR detector.

14. The IR detector array of claim 13, wherein the top layer of each of at least some of the plurality of IR detectors comprises a plurality of square structures arranged in rows and columns, and wherein the dimension that is set comprises at least one of a width of each structure or a distance between each column of the plurality of square structures.

15. The IR detector array of claim 11, wherein each bottom electrode comprises platinum, each top layer comprises aluminum, wherein each piezoelectric layer comprises one of aluminum nitride and gallium nitride, and wherein each RF resonator is one of a micro-electro-mechanical (MEM) device or a nano-electro-mechanical (NEM) device.

16. The IR detector array of claim 11, wherein the bottom electrode of at least some of the plurality of IR detectors comprises an interdigitated electrode.

17. The IR detector array of claim 11, wherein each of the plurality of IR detectors further comprises:
a first anchor extending from a first end of the piezoelectric layer and attached to the semiconductor substrate, the first anchor including a first lead from the bottom electrode to an RF signal probe pad; and
a second anchor extending from a second end of the piezoelectric layer and attached to the semiconductor substrate, the second anchor including a second lead from the bottom electrode to a ground probe pad.

* * * * *